Aug. 3, 1954     A. J. BJERKAN     2,685,356
CLUTCH MECHANISM

Filed Feb. 19, 1948     2 Sheets-Sheet 1

INVENTOR.
ARTHUR J. BJERKAN
BY
ATTORNEYS

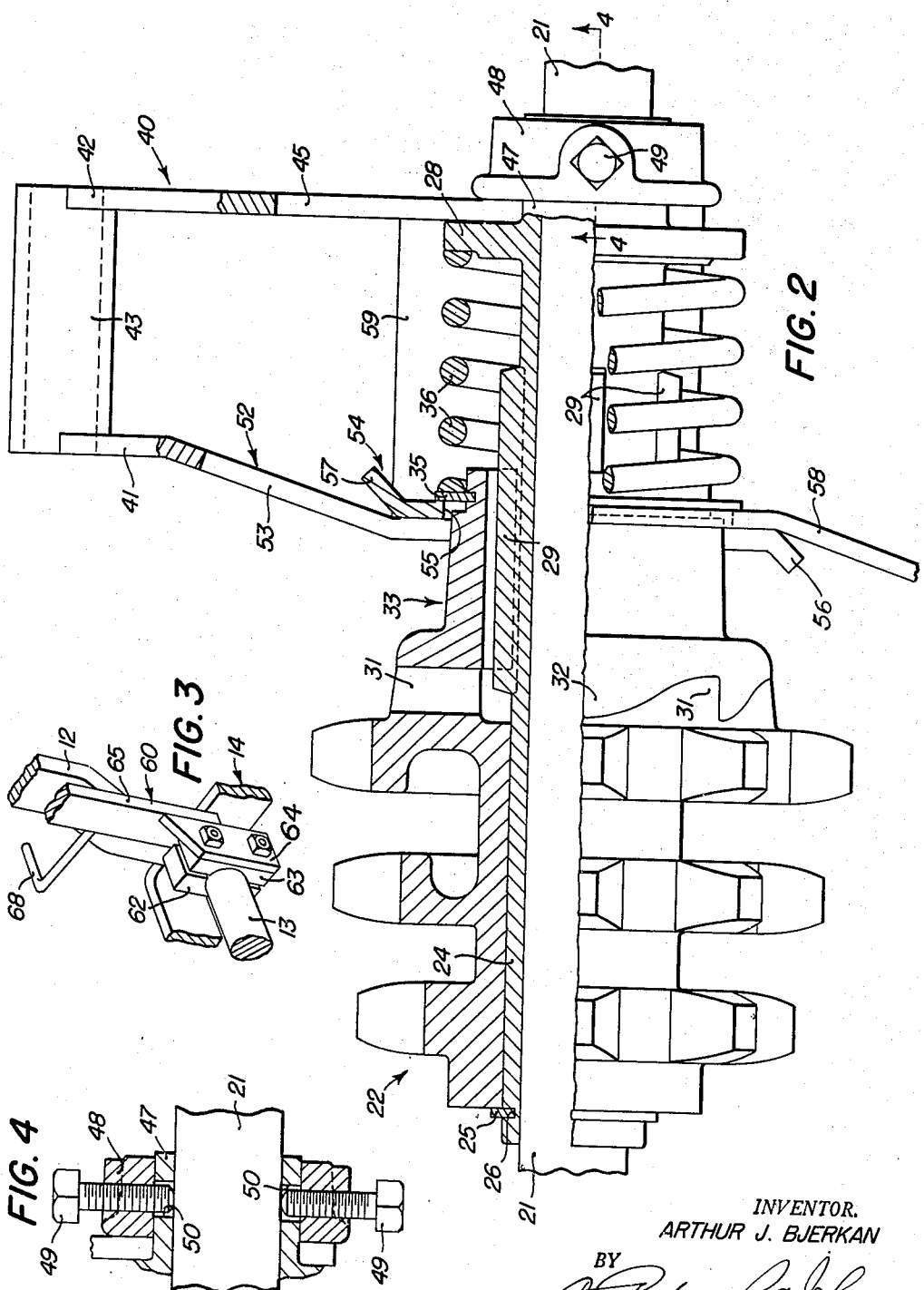

Patented Aug. 3, 1954

2,685,356

UNITED STATES PATENT OFFICE 2,685,356

CLUTCH MECHANISM

Arthur J. Bjerkan, Moline, Ill., assignor to Deere & Company, Moline, Ill., a corporation of Illinois Application February 19, 1948, Serial No. 9,442

8 Claims. (Cl. 192—89)

The present invention relates generally to agricultural implements and more particularly to planting implements having throw-out or disconnect clutch means normally adapted to interrupt the seeding operation when the seed furrow forming means of the planter is raised to an inoperative position, as for transport.

The object and general nature of the present invention is the provision of a new and improved clutch mechanism especially adapted for tractor drawn planters which, when in transport position, are frequently driven at comparatively high speeds from field to field, along highways, roads and the like. More particularly it is a feature of this invention to provide a clutch mechanism so constructed and arranged so that when the clutch is disconnected the driving part of the clutch unit is freely rotatable and does not have imposed on it any friction drag due to the clutch spring which, in some clutches with which I am familiar, acts against the driving member when the clutch is disconnected. In an implement of this kind it is quite objectionable to have a clutch spring acting against the driving member of the clutch at all times during transport.

Further, it is an important feature of this invention to provide a clutch mechanism which is particularly adapted to be operated by the power lift mechanism of the planter which normally raises and lowers the tools or furrow openers into and out of transport position. More specifically, another feature of this invention lies in the provision of a clutch control mechanism which is so constructed and arranged that the clutch spring is compressed from opposite ends of the spring to provide for disconnecting the clutch, whereby the pressure of the spring during transport is not exerted against any moving part.

These and other objects and advantages of the present invention will be apparent to those skilled in the art after a detailed description of the preferred structure in which the principles of the present invention have been incorporated.

In the drawings:

Figure 2 is a sectional view taken through the clutch mechanism.

Figure 3 is a fragmentary detail view of the clutch control arm support.

Figure 4 is a fragmentary section taken along the line 4—4 of Figure 2.

Figure 1:
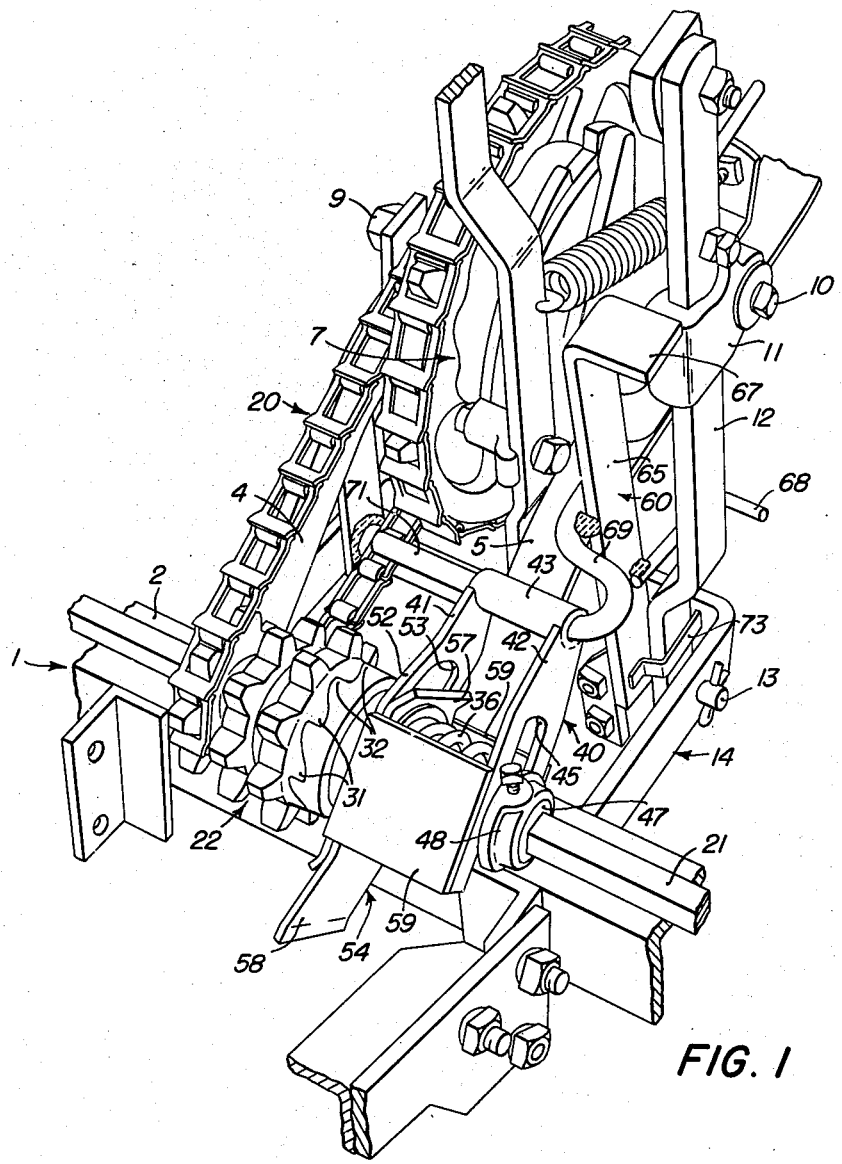
Figure 1 is a fragmentary perspective of the clutch control member of my new and improved clutch mechanism and its relation to the tractor power lift mechanism.

Referring now to the drawings, the main frame of the planter is indicated in its entirety by the reference numeral 1 and comprises a front transverse frame bar 2, preferably in the form of an angle, a rear transverse frame bar and a plurality of longitudinally extending cross bars 4 and 5 secured at their ends to the front and rear transverse frame bars. Mounted on the generally centrally disposed cross bars 4 and 5 is the power actuated lift clutch unit 7 with which the planter 1 is usually equipped. The present invention is not especially concerned with the details per se of the power lift self-interrupting clutch unit 7, and hence only fragmentary details have been shown in Figure 1. The power lift clutch unit 7 is for all practical purposes substantially the same as the power lift clutch unit disclosed and claimed in the United States Patent No. 2,376,464, issued May 22, 1945 to Charles H. White, to which reference may be made if necessary. Briefly, the power lift unit 7 comprises a self-interrupting clutch and an operating linkage constructed in the form of a Whitworth quick return motion. The self-interrupting clutch comprises a driving member mounted coaxially on a supporting shaft 9 and a driven member in the form of a crank 10 rotatable about the axis of the shaft 9 and including a slide 11 which operates along a generally vertically extending arm 12 fixed at its lower end to or rockably mounted on a shaft 13 which is carried in a U-shaped sub-frame 14 generally below the cross bars 4 and 5 and which is welded at its forward end portions or otherwise secured to the front frame angle 2. When the power lift unit 7 is operated the arm or lever 12 is swung in a generally fore and aft direction about its pivotal support at the shaft 13, and this motion is made use of in my new and improved disconnect clutch mechanism, for controlling the drive for the seeding mechanism.

Mounted on the front frame bar 2 by suitable bearing brackets (not shown) in a generally transverse position is a seeding shaft 21 which usually extends the length of the main frame. The frame 1 is supported by a pair of ground wheels which, as shown more completely in the above-mentioned White patent, are connected by a chain 20 to continually drive a driving member 22 in the form of a compound sprocket gear. The driving sprocket gear member 22 is mounted for rotation on one end of a tubular shaft or sleeve 24, the outer surface of which is cylindrical and the inner portion of which is square in cross section to fit non-rotatably on the seeding shaft 21. Thus, the sleeve or tubular shaft 24 may readily be shifted along the seeding shaft 21 to line up the sprocket gear 22 with the driving chain 20 that extends to the wheel drive. The gear or driving member 22 is held against axial displacement relative to the sleeve 24 in one direction by the snap ring 25 which fits in a groove 26 formed in one end of the sleeve or tubular shaft member 24.

The other end of the sleeve 24 is provided with an abutment flange 28 and laterally inwardly of the latter the sleeve 24 carries a plurality of axially extending splines 29, the ends thereof opposite the flange 28 abutting the gear member 22 to prevent axial displacement along the sleeve 24 toward the flange 28. The inner end of the driving member 22 is provided with a plurality of clutch teeth 31, which together form a clutch section carried by the driving member 22. The clutch teeth 31 are adapted to mesh with corresponding teeth 32 formed on an axially shiftable clutch member 33 mounted slidingly but non-rotatably on the splined portion 29 of the sleeve 24. An abutment ring 35 seats in a groove in the outer end of the clutch member 33 and a compression spring 36 bears at one end against the ring 35 and at its other end against the inner face of the abutment flange 28. Thus, the spring 36 reacts at its outer end against the flange 28 and at its inner end against the clutch member 33 so as to urge the latter axially along the sleeve 24 into driving engagement with the driving gear member 22. When the teeth 32 of the clutch member 33 engage the clutch teeth 31 of the driving member 22 a drive is established between the driving gear 22, the sleeve 24 and the seeding shaft 21. To disconnect or interrupt the drive, the clutch member 33 is shifted against the force of the spring 36 toward the flange 28 until the teeth 32 disengage from the teeth 31. The clutch section 31 and clutch member 33 constitute a clutch that transmits the drive from the driving gear member 22 to the driven shaft member 21 through the sleeve 24 that is fixed to the shaft 21. The ring 35 constitutes an abutment on the driven member of said clutch and the flange 28 constitutes an abutment carried on the driven shaft 21.

According to the principles of the present invention a clutch control member 40 is employed for engaging and disengaging the clutch but is so arranged that when the clutch is disengaged there is no spring pressure exerted against the driving member 22, and hence the latter, which is continuously driven, rotates freely and without excessive wear. The clutch control member 40 includes a pair of slotted side plates 41 and 42 rigidly interconnected at their upper or outer ends by a tubular part 43, to which the ends of the side plates 41 and 42 are welded. The side plate 42 is disposed on the laterally outer side of the abutment flange 28 and the slot 45 therein receives the laterally outwardly extending end or hub section 47 of the sleeve 24. A locking collar 48 is mounted on the hub section 47 laterally outwardly of the side member 42. While normally the spring 36 urges the member 40 to the left, as viewed in Figure 2, holding the plate 42 against the outer face of the flange 28, the collar 48 will also perform this function, especially if the spring 36 should fail. The collar 48 is provided with a pair of diametrically opposed set screws 49 which at their inner ends, as shown in Figure 4, extend through a pair of enlarged openings 50 in the hub 47 into engagement with opposite sides of the seeding shaft 21, thus holding the sleeve 24 and the entire clutch assembly in the desired position along the shaft 21. However, the openings 50 are larger than the set screws 49 so as to permit some looseness between the shaft 21 and the sleeve 24, whereby the latter may be formed as a casting and received on the shaft 21 in driving relation but without having to be machined. The other side plate 41 of the clutch control member 40 is angled to form a cam section, as indicated at 52, and this portion is slotted, as at 53, to receive the clutch member 33. The inner face of the side plate 41 bears against a cam washer 54 which is provided with a circular opening 55 permitting the washer 54 to be placed over the inner end of the clutch member 33 against the abutment ring 35, the cam washer 54 thus serving as an abutment against which the cam section 52 of the side plate 41 may bear.

In operation, referring particularly to Figure 2, whenever the clutch control member 40 is shifted transversely of the shaft 21 downwardly, as viewed in Figure 2, the cam section 52 acts against the cam washer 54, the ends of which are bent, as at 57 and 58, to form guiding sections, the clutch member 33 is drawn to the right against the compression in the spring 36. As best shown in Figure 2, the outer end of the plate 41 is bent, as at 56, which, taken with the cam section 52, forms cam portions that are angled in generally complementary relation with respect to the angled cam ends 57 and 58 of the cam washer 54. The two side plate sections 41 and 42 of the clutch control member 40 are rigidly interconnected by a pair of rectangular cross plates 59 which engage the opposite sides or edges of the cam washer 54. Therefore, when the member 40 is caused to move downwardly in Figure 2 and transversely of the seeding shaft 21, the clutch spring 36 is compressed by means acting against the outer face of the abutment flange 28 and against the outer face of the abutment ring 35 through the cam washer 54, thereby holding the spring 36 compressed and the clutch disengaged but without having the spring pressure act against any of the rotating parts, the seeding shaft 21 and the sleeve 24 coming to a standstill as soon as the clutch teeth 31 and 32 are disengaged by movement of the clutch member 33 to the right.

The clutch control member 40 is so constructed and arranged as to be shifted both transversely and rockingly relative to the seeding shaft 21 since the means that operates the clutch control member 40 is in the nature of a pivoted part and hence some rocking movement of the member 40 relative to the shaft 21 is entailed whenever the member 40 is shifted transversely by pivoting movement of the operating member. This operating means will now be described.

Referring to Figure 1, a clutch throw-out arm unit 60 is mounted for rocking movement on the shaft 13 alongside the power lift lever 12 by any suitable means, such as a pair of clamp castings 62 and 63, disposed loosely about the shaft 13 and bolted to a bracket extension 64 that is welded to the lower end of the strap 65 making up the major portion of the arm 60. The arm 60 carries a pair of fore and aft spaced apart stops 67 and 68, the former being formed by bending over the upper end of the strap 65 and the latter being formed on a short rod welded to the strap 65. Also welded to the strap 65 is an arm 69 which is formed to have a transversely extending section 71 of considerable length and of such diameter as to snugly fit within the tube 43 that rigidly connects the side plates 41 and 42 of the clutch control member 40. A clip 73 overlapping the lower portion of the power lift arm 12 is fixed, as by welding, to the lower portion of the strap 65 so as to hold the arm or lever unit 60 against lateral displacement away from the power lift arm 12.

The operation of the structure described above is substantially as follows:

Whenever it is desired to raise the planter furrow openers into their transport position, being the position shown in Figure 1, the power lift unit 6 is operated to swing the power lift arm 12 into its forward position. This causes the forward edge thereof to engage the projection 67 and shift the clutch control arm 60 in a forward direction which, in turn, shifts the clutch control cam member 40 generally forwardly and downwardly relative to the seeding shaft 21. This causes the cam section 52 to force the cam washer 54 and the clutch member 33 to the right, as viewed in Figure 2, thus interrupting the drive. However, the member 22 remains continuously driven and rotates on the end of the sleeve 24 freely and without restraint, since the pressure exerted by the spring 36 is sustained by the two rigidly interconnected cam plate sections 41 and 42 acting through the flange 28 and the abutment member 35. Whenever it is desired to lower the furrow openers, the power lift clutch 6 is operated to swing the arm 12 rearwardly. Such rearward movement causes the rear edge of the arm 12 to engage the projection 68 and rocks the arm unit 60 rearwardly, thus pulling rearwardly and upwardly on the cam unit 40 to permit the spring 36 to expand and shift the clutch 33 into engagement with the clutch section 31 on the driving member 22. Not only does the cam member 40 shift transversely relative to the shaft 41 but it is also rocked generally about the axis of the seeding shaft 21, due to the pivoting movement of the arm 60.

It will be noted that the arm section 69 is extended in a generally axial direction, as at 71, for a distance substantially greater than the length of the tubular sleeve 43. This is for the purpose of accommodating shifting of the entire clutch unit, as by loosening the set screw 49, along the seeding shaft 21 to accommodate connecting the driving chain to one or the other, as desired, of the sprockets on the driving member 22. In making this adjustment the sleeve section 43 of the clutch control unit 40 merely shifts laterally along the extended end 71 of the arm 69 that is actuated by the power lift lever 12.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A clutch actuator adapted to act between an abutment on a driven shaft and an abutment on a driven clutch member shiftable on said shaft, said clutch actuator comprising a cam washer having spaced apart angled cam ends and an opening to receive said clutch member and engage the abutment thereon, and a cam member having two angularly related rigidly interconnected sections, each having an elongated opening, whereby said sections are adapted to be shifted transversely of said shaft and adapted to act, respectively, against said cam washer and said first mentioned abutment for shifting said clutch member axially along said shaft, the section of said cam member engaging said cam washer having cam portions angled in complementary relation with respect to the angled cam ends of said cam washer.

2. A clutch actuator adapted to act between an abutment on a driven shaft and an abutment on a driven clutch member shiftable on said shaft, said clutch actuator comprising a control member having parts disposed at an angle to one another, one adapted to act against the outer face of said first abutment and the other adapted to act against the abutment on said clutch member for shifting the latter axially along said shaft, and means disposed in a position to engage the outer face of said one part, at the side opposite the outer face of said first abutment, for holding said one part of said control member against the outer face of said first abutment.

3. In an agricultural machine including a driven shaft, a driving member mounted for rotation relative to said shaft, a sleeve member mounted non-rotatably on said shaft and having one end rotatably receiving said driving member, the latter having axially inwardly facing clutch teeth, a driven clutch member mounted for sliding but non-rotatable movement on said sleeve and including clutch teeth adapted to be brought into clutching engagement with the clutch teeth on said driving member, an abutment flange on the other end of said sleeve member, spring means acting between said abutment flange and the adjacent end of said axially shiftable clutch member for urging the latter into engaging relation with respect to said driving member, and abutment means on the axially inner end of said clutch member: the improvement which includes a cam washer having an opening to receive said driven clutch member and rotatable thereon in substantial engagement with the abutment means on said driven clutch member on the laterally outer side thereof, said cam washer having cam sections at each side of said opening, a cam member including a pair of laterally spaced rigidly interconnected slotted side portions adapted to be disposed, respectively, against the outer face of said abutment flange and the laterally outer face of said cam washer, said cam member being adapted to be shifted transversely and also to be mounted for rocking movement relative to said sleeve and clutch member, said cam member also including a pair of transverse plates embracing said cam washer and rigidly connecting the side portions of said cam member, said cam washer fitting between said transverse plates and held thereby against rotation relative to said cam member, and arm means mounted for rocking movement about an axis parallel to and spaced from the axis of said driven shaft and pivotally connected with the outer end of said cam member for shifting the same transversely and rockingly relative to said sleeve to engage and disengage the driven clutch member with said driving clutch sections.

4. Control means for a disconnect clutch mechanism of the type comprising a sleeve, an abutment at one end of said sleeve, and a clutch member slidably disposed on said sleeve: said control means comprising a cam washer adapted to engage and bear at one side against said slidable clutch member, said cam washer having angled cam sections, a disconnect cam comprising a pair of rigidly interconnected slotted side members adapted to receive and to be shifted transversely of said sleeve, one of said side members being adapted to engage said sleeve and the other of said side members being adapted to engage the other side of the cam washer on said clutch member, said other side member having angled cam sections engageable with the angled cam sections of said cam washer, whereby transverse movement of said disconnect cam in one direction acts to shift said clutch member on said sleeve, and means for shifting said disconnect cam.

5. In a clutch, a driven shaft, a first abutment thereon, a clutch member, a second abutment on the clutch member, said clutch member being shiftable on said shaft in axially movable but non-rotatable relation, and a clutch-actuator comprising a cam washer having spaced apart angled cam ends and an opening receiving said clutch member and engaging the abutment thereon, and a cam member having two angularly related, rigidly interconnected sections, each having an elongated opening, whereby said sections are shiftable transversely of said shaft and, when so shifted, act, respectively, against said cam washer and said first abutment for shifting said clutch member axially along said shaft, the section of said cam member engaging said cam washer having cam portions angled in complementary relation with respect to the angled cam ends of said cam washer.

6. In a clutch, a driven shaft, a first abutment thereon, a clutch member, a second abutment on the clutch member, and a clutch actuator comprising a control member having parts disposed at an acute angle with respect to one another and shiftable transversely of said shaft, one part acting against the outer face of said first abutment and the other part acting against said second abutment for shifting the clutch member axially along said shaft, and means fixed to said shaft in a position thereon to engage the outer face of said one part, at the side opposite the outer face of said first abutment, for holding said one part of the control member against the outer face of said first abutment.

7. The invention set forth in claim 6, further characterized by said holding means including a collar encircling the outer end of said sleeve, the latter having a sleeve slidably but non-rotatably mounted on the driven shaft, said clutch member being rotatably mounted on said sleeve, and opening means therein, and means carried by said collar and extending through said opening means for connection with said shaft for securing both said collar and said sleeve to said shaft.

8. In a clutch, a driven shaft, a sleeve thereon and connected therewith in non-rotatable relation, an abutment at one end of said sleeve, a clutch member slidably disposed on said sleeve in non-rotatable relation with respect thereto, a driving member rotatable on said sleeve adjacent said clutch member and having means positioned to be engaged by said clutch member, actuating means for said clutch member, comprising a cam washer engaging and bearing at one side against said slidable clutch member, said cam washer and angled cam sections, and a disconnect cam comprising a pair of rigidly interconnected slotted side members receiving and shiftable transversely relative to said sleeve, one of said side members engaging said abutment on said sleeve and the other of said side members engaging the other side of said cam washer on said clutch member, said other side member having angled cam sections engageable with the angled cam sections of said cam washer, whereby transverse movement of said disconnect cam in one direction acts to shift said clutch member on said sleeve, a collar disposed on the end of said sleeve outside said abutment and the associated side member of said disconnect cam, said end of said sleeve having openings therein, and a pair of fasteners carried by said collar and extending through said openings into engagement with said shaft and adapted when tightened to lock the collar to said shaft and also hold said sleeve against axial displacement relative to said shaft.

References Cited in the file of this patent

UNITED STATES PATENTS

| Number | Name | Date |
|---|---|---|
| 142,599 | West | Sept. 9, 1873 |
| 422,402 | Haberlin | Mar. 4, 1890 |
| 694,598 | Armitage | Mar. 4, 1902 |
| 743,078 | Henn | Nov. 3, 1903 |
| 814,070 | Nelson | Mar. 6, 1906 |
| 995,043 | Swartz | June 13, 1911 |
| 1,118,536 | Dickerson | Nov. 24, 1914 |
| 1,300,819 | Combs | Apr. 19, 1919 |
| 1,405,927 | Lauth | Feb. 7, 1922 |
| 1,968,187 | White | July 31, 1934 |
| 2,055,258 | McNeil | Sept. 22, 1936 |
| 2,260,770 | Brownlee | Oct. 28, 1941 |
| 2,423,043 | Olstad | June 24, 1947 |
| 2,563,186 | Oehler et al. | Aug. 7, 1951 |